(12) United States Patent
Tao et al.

(10) Patent No.: US 8,929,947 B2
(45) Date of Patent: *Jan. 6, 2015

(54) LOCAL EXCHANGE IMPLEMENTATION METHOD FOR LOCAL CALL

(75) Inventors: Quanjun Tao, Guangdong Province (CN); Zhendong Li, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 348 days.

This patent is subject to a terminal disclaimer.

(21) Appl. No.: 13/257,663

(22) PCT Filed: Nov. 12, 2010

(86) PCT No.: PCT/CN2010/078680
§ 371 (c)(1),
(2), (4) Date: May 7, 2012

(87) PCT Pub. No.: WO2011/057578
PCT Pub. Date: May 19, 2011

(65) Prior Publication Data
US 2012/0252461 A1    Oct. 4, 2012

(30) Foreign Application Priority Data
Nov. 12, 2009    (CN) .......................... 2009 1 0220908

(51) Int. Cl.
*H04M 1/00* (2006.01)
*H04W 76/04* (2009.01)

(52) U.S. Cl.
CPC ...... *H04W 76/04* (2013.01); *H04M 2203/2022* (2013.01)
USPC ..................... 455/554.1; 455/432.1; 455/434; 455/435.1; 455/435.2; 455/555

(58) Field of Classification Search
USPC ......................... 455/554.2, 555, 554.1, 426.2
See application file for complete search history.

(56) References Cited

U.S. PATENT DOCUMENTS

2012/0135740 A1*   5/2012   Hellwig et al. ............... 455/445
2012/0270554 A1*   10/2012  Hellwig et al. ............... 455/445

FOREIGN PATENT DOCUMENTS

| CN | 1196157 A | 10/1998 |
| CN | 1303224 A | 7/2001 |
| CN | 101159905 A | 4/2008 |
| CN | 101185299 A | 5/2008 |

OTHER PUBLICATIONS

International Search Report for PCT/CN2010/078680 dated Jan. 20, 2011.

* cited by examiner

*Primary Examiner* — Kiet Doan
*Assistant Examiner* — Dung Lam
(74) *Attorney, Agent, or Firm* — Ling Wu; Stephen Yang; Ling and Yang Intellectual Property

(57) ABSTRACT

The present invention discloses a method for implementing local exchange for a local call, including: a calling side mobile switch center (MSC) receiving a call setup request from a calling user, and the calling side MSC transferring a local reference to a calling side base station system (BSS) and a called side MSC, and transferring a calling access location information to the called side MSC; the called side MSC receiving the local reference and transferring the local reference to a called side BSS; and the called side MSC determining that a call is a local call according to the calling access information, and notifying the called side BSS to execute the local exchange. The present invention solves the problem that the local exchange is unsuccessful caused by one BBS connecting a plurality of MSCs.

6 Claims, 4 Drawing Sheets

LOCAL EXCHANGE IMPLEMENTATION METHOD FOR LOCAL CALL

TECHNICAL FIELD

The present invention relates to the communication field, and in particular, to a method for implementing local exchange for a local call in a circuit switched domain.

BACKGROUND OF THE RELATED ART

The mobile network, such as the global system for mobile communications (GSM) and the universal mobile telecommunications system (UMTS) etc., adopts a circuit switched technology, named as circuit switched (CS for short) domain, which can provide a basic voice service and some complementary services based on the voice service to the user.

In some places of the world such as Africa, South America and South Asia, etc., a lack of rapid and reliable transmission resources or the high transmission cost brings the operator with some difficulty in the network and service deployment. However, according to the statistic data, most calls in the mobile network are local calls in those places, and these calls are generated in the same base station system (BSS). For the local call, if the local exchange technology is adopted (the voice data is looped at the BSS), then the A port transmission resource between the BSS and a mobile switch center (MSC) of the core network is saved.

FIG. 1 is a diagram of a traditional voice call, a user equipment (UE) accesses the BSS and the MSC through the circuit switched domain. When a UE1 calls a UE2, the UE1 sends a call setup request to its accessed MSC through the BSS; the MSC finds the called UE2 according to an accessing location information of UE2, and notifies the BSS to establish a radio bearer connected to the UE1 and the UE2, and establish the bearers of the UE1 and the UE2 between the BSS and the MSC respectively; the two side bearers of the MSC are looped, so as to ensure a voice communication between the UE1 and the UE2.

FIG. 2 is a diagram of a voice call using the local call and local exchange technology, compared with FIG. 1, when the MSC receives the call setup request of the UE1, the MSC judges whether the UE1 and the UE2 belong to one same BSS according to a cell; if the UE1 and the UE2 belong to one same BSS, then the MSC notifies the BSS to execute the local exchange; the bearer loop of the UE1 and the UE2 is executed at the BSS side, thus the bearer resources between the BSS and the MSS are saved.

FIG. 3 is a signaling flow of using the local call and local exchange technology in FIG. 2, including the following steps:

in step 301, the UE1 and the UE2 initiate a call under the same BSS, and establish the interconnection through a core network, and the MSC assigns a circuit number or a call identifier between the BSS and the MSC for the calling UE1 and the called UE2;

in step 302, the called UE2 replies in the ringing status, and sends a called reply message to the MSC through the BSS;

in step 303, the MSC sends the called reply message to the calling UE1, and notifies the UE1 of call connecting;

in step 304, the MSC judges whether the current call is a local call belonged to one same BSS according to the present location information of the calling UE1 and the called UE2;

in step 305, if being a local call belonged to one same BSS, then the MSC sends a local exchange command message to the BSS, and notifies the BSS to execute the local exchange, and the local exchange command message includes the circuit number or the call identifier between the BSS and the MSC assigned for the calling UE1 and the called UE2 by the MSC in step 301;

in step 306, the BSS receives the local exchange command message, associates to two ongoing communication sessions according to the circuit number or the call identifier of the calling or the called in the local exchange command message, and performs the loop on its voice data bearer, so as to realize the exchange of the voice bearer inside the BSS;

in step 307, after the local exchange succeeds, the BSS sends a local exchange success message to the MSC;

in step 308, the MSC, after receiving the local exchange success message, notifies the BSS to release the voice bearer connection between the BSS and the MSC.

According to the analysis of the above steps, if in the case that one BSS connects with a plurality of MSCs, as shown in FIG. 4, the calling UE1 accesses a MSC1 through the BSS, and the called UE2 accesses a MSC2 through the BSS. Although the calling and the called initiate a call in one same BSS, the calling and the called access the different MSCs respectively, thus causing the problem that no matter the MSC1 accessed by the calling UE1, or the MSC2 accessed by the called UE2 shown in step 304 is unable to judge whether the current call is a local call according to the location information of the calling and the called, and finally causing the problem that the local call is unable to execute the local exchange.

CONTENT OF THE INVENTION

The objective of the present invention is to provide a method for implementing local exchange for a local call, so as to solve the problem that the local exchange is unsuccessful caused by one BBS connecting a plurality of MSCs.

The present invention provides a method for implementing local exchange for a local call, comprising:

a calling side MSC receiving a call setup request from a calling user, and the calling side MSC transferring a local reference to a calling side BSS and a called side MSC, and transferring a calling access location information to the called side MSC; and the called side MSC receiving the local reference and transferring the local reference to a called side BSS; and the called side MSC determining that a call is a local call according to the calling access information, and notifying the called side BSS to execute a local exchange.

The above method may have the following features, the step of the calling side MSC transferring the local reference to the calling side BSS and the called side MSC further comprises:

the calling side MSC determining that both the calling side MSC and the calling side BSS meet a local exchange condition, and transferring the local reference to the calling side BSS and the called side MSC.

The above method may have the following features, the meeting the local exchange condition is that: the user currently has no session of ongoing communication with other users, which meets a user management strategy for the local exchange of an operator, and both the BSS and the MSC in which the calling user locates meet the local exchange condition.

The above method may have the following features, the local reference is a number associated with the call which is assigned by the calling side MSC for the current call, and the mode for acquiring the local reference comprises:

the calling side MSC assigning the local reference according to a calling number and a called number in the call;

or, the calling side MSC assigning the local reference according to a circuit number or a call indicator between the calling side BSS and the calling side MSC.

The above method may have the following features, the step of the calling side MSC transferring the local reference to the calling side BSS and the called side MSC, and transferring the calling access location information to the called side MSC further comprises:

the calling side MSC bringing the assigned local reference in a terrestrial circuit assignment message to the calling side BSS, or transferring the assigned local reference to the calling side BSS through an individual notification message; when the calling side MSC and the called side MSC belong to different MSCs, the calling side MSC bringing the local reference, the calling side MSC supporting local exchange condition and the calling access location message to the called side MSC through in an initial address message, or transferring the local reference, the calling side MSC supporting local exchange condition and the calling access location message through the individual notification message; and when the local reference is obtained by the calling side MSC according to a calling number and a called number, the called side MSC alternatively obtaining the local reference number according to the calling number and the called number in the initial address message.

The above method may have the following features, the step of the called side MSC transferring the local reference to the called side BSS further comprises:

the called side MSC receiving the call setup request from the calling side MSC, the called side MSC determining that both the called side MSC and the called side BSS meet the local exchange condition, and the local exchange condition referring to that the user currently has no session of ongoing communication with other users, which meets the user management strategy for the local exchange of an operator; and if determining that the called user meets the local exchange condition, the called side MSC transferring the local reference obtained from the calling side MSC to the called side BSS, the transferring step comprising: the called side MSC bringing the local reference to the called side BSS in the terrestrial circuit assignment message, or transferring the local reference to the called side BSS through an individual notification message.

The above method may have the following features, the step of the called side MSC determining that the call is a local call according to the calling access information, and notifying the called side BSS to execute the local exchange further comprises:

the called side MSC judging whether the calling and the called are in a same BSS according to the calling access location information; if yes, and both the calling side MSC and the called side MSC meet the local exchange condition, the MSC notifying the BSS to execute the local exchange, the notification message including the local reference; and the called side BSS receiving a command of executing the local exchange, associating a calling call branch and a called call branch according to the local reference in the command, the association being successful and executing the local exchange, and feeding back the association and execution result to the calling side MSC and the called side MSC.

Compared with the prior art, the present invention provides a method for implementing local exchange for a local call, so as to solve the problem that the local exchange is unsuccessful caused by one BBS connecting a plurality of MSCs.

PREFERRED EMBODIMENTS OF THE PRESENT INVENTION

The present invention is further described in detail with reference to the accompanying drawings and embodiments hereinafter.

Figure 1:
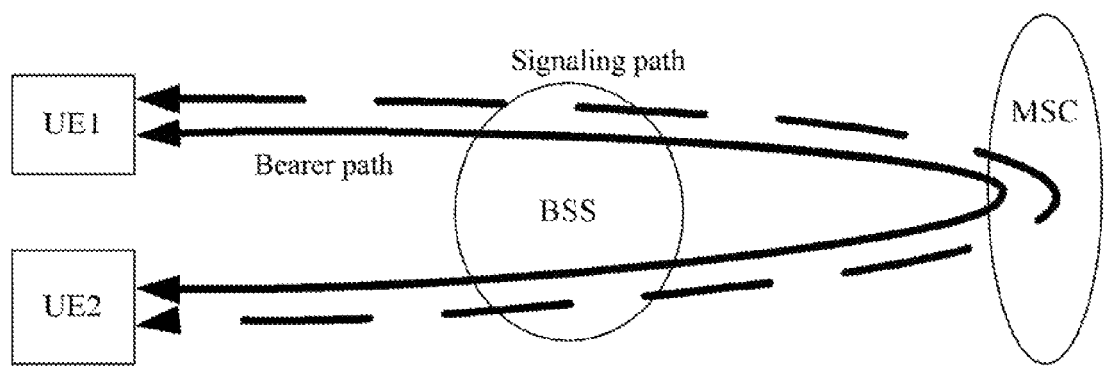
FIG. 1 is a diagram of a traditional voice call.
Figure 2:
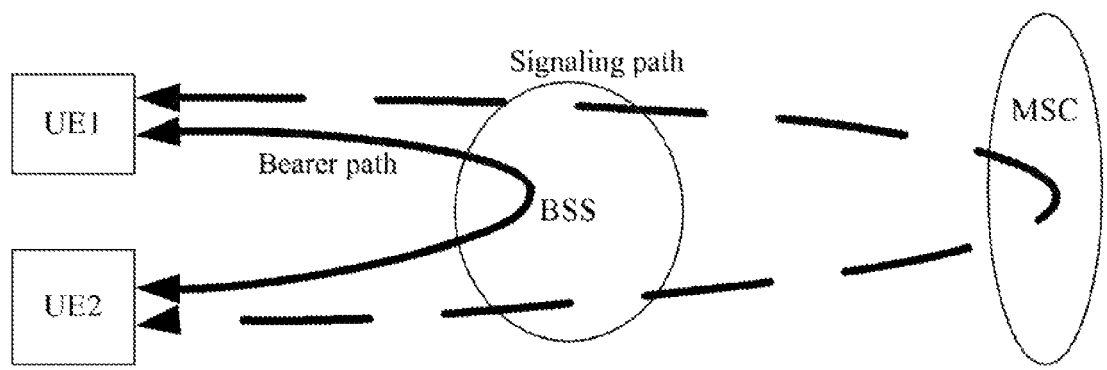
FIG. 2 is a diagram of a voice call adopting a local call and local exchange technology.
Figure 3:
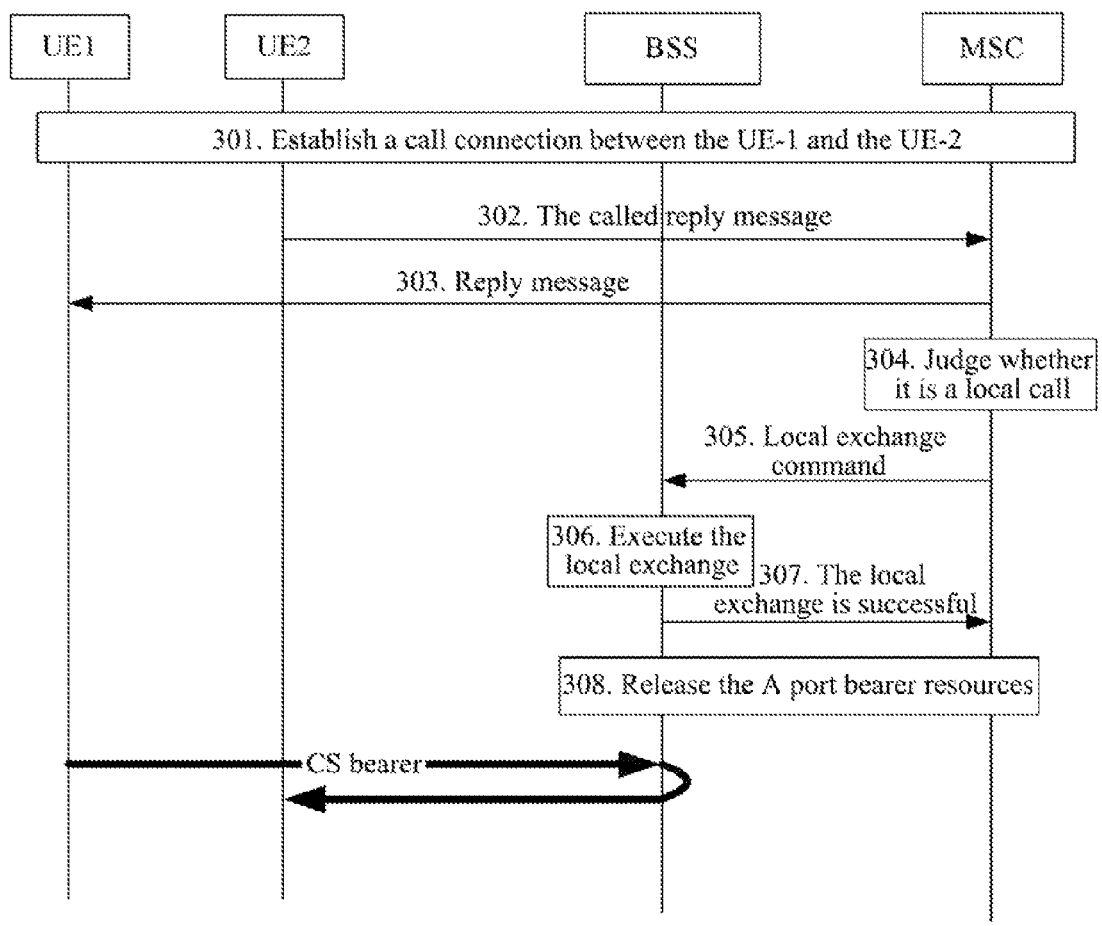
FIG. 3 is a signaling flow chart of adopting a local call and local exchange technology in FIG. 2.
Figure 4:
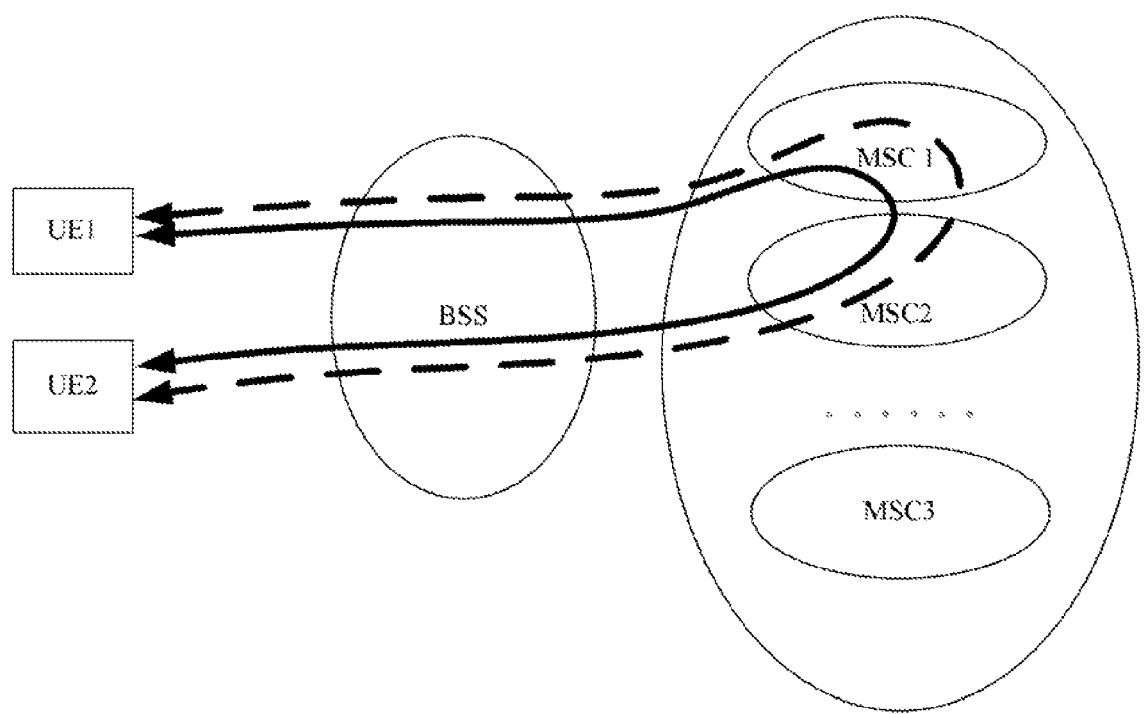
FIG. 4 is a diagram of a case of one BSS connecting with a plurality of MSCs.
Figure 5:
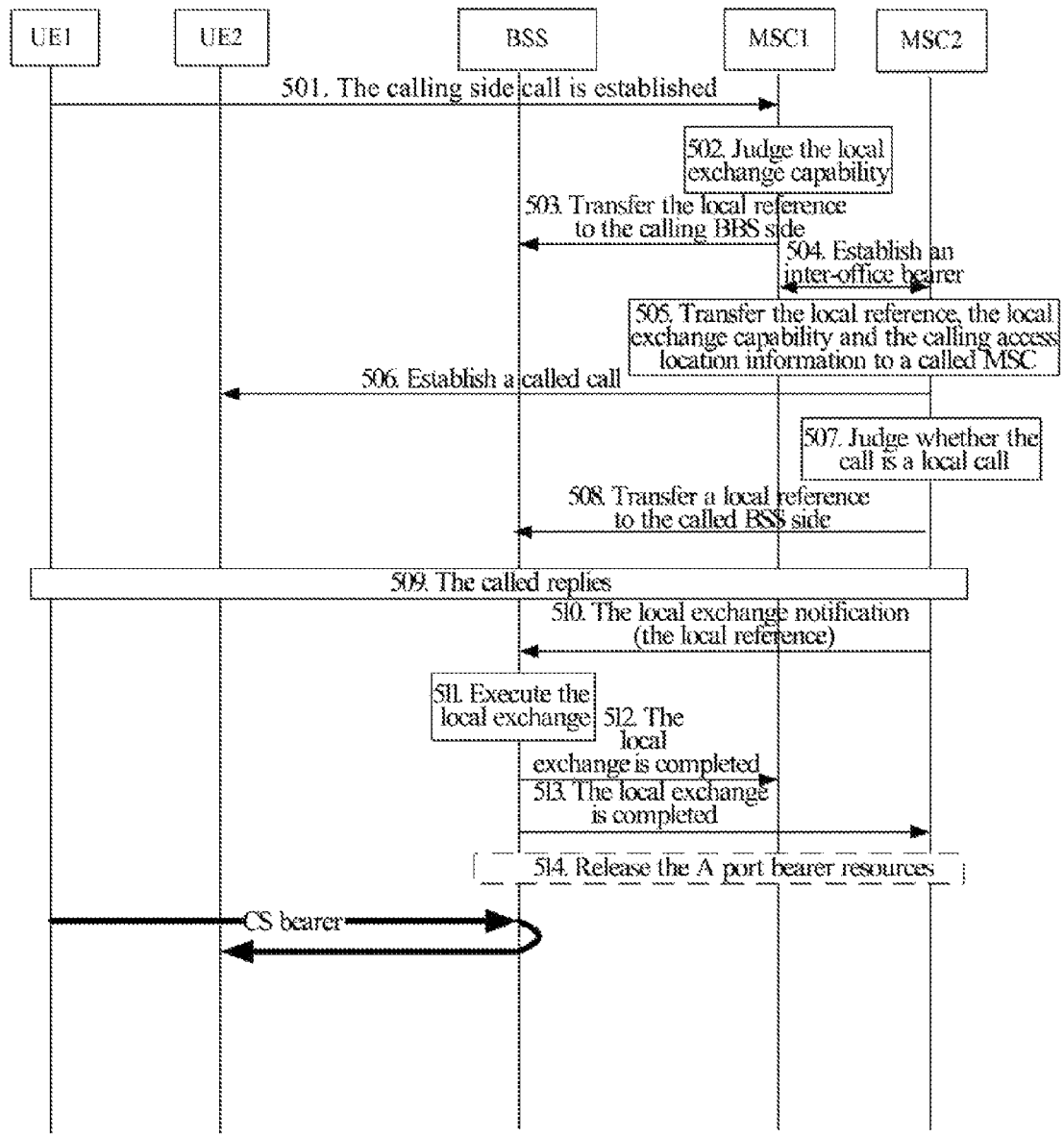
FIG. 5 is a flow chart of a local exchange executed in a scenario of a calling user and a called user being in one same BSS while belonging to different MSCs according to the embodiment of the present invention.

FIG. 5 is a flow chart of a local exchange executed in a scenario of a calling user and a called user being in one same BSS while belonging to different MSCs according to an embodiment. In the present embodiment, the UE1 and the UE2 are in one same BSS, the UE1 accesses the MSC1 through the BSS, and the UE2 accesses the MSC2 through the BSS. The UE1 calls the UE2, and the local reference of the BSS associates a call between the BSS and the UE1 with a call between the BSS and the UE2 and executes the local exchange. As shown in FIG. 5, the present embodiment includes the following steps:

in step 501, the UE1 sends a call setup request to the MSC1 through the BSS, and the called in the request message is the UE2;

in step 502, the MSC1 judges whether the UE1 currently has a session of ongoing communication with the other user, and whether it meets a user management strategy for the local exchange of an operator, and judges whether the BSS and the MSC1 support the local exchange;

in step 503, if it determines in step 502 that the UE1 meets the condition, then the MSC1 assigns the local reference, and assignment mode includes the following modes:

(1) the MSC1 assigns the local reference according to a calling and a called number in a call;

(2) the MSC1 assigns the local reference according to a circuit number or a call identifier between the BSS and the MSC;

the MSC1 brings the assigned local reference in a terrestrial circuit assignment message to the calling side BSS, or transfers the assigned local reference in an individual notification message to the calling side BSS;

in step 504, according to a called number of the UE2, or a user roaming number obtained from the user home server of the UE2, the MSC1 establishes an inter-office bearer and sends an inter-office bearer establishment message to the MSC2;

in step 505, if it determines in step 502 that the UE1 meets the local exchange condition, then the MSC1 transfers the local reference, a local exchange capacity indicator of the MSC1 and the BSS-ID of the UE1 accessing the BSS to the MSC2, and the transferring mode can adopt the following modes:

the MSC1 transfers the above-mentioned information to the MSC2 through an initial address message or through an individual notification message. When the MSC1 obtains the local reference according to the calling and the called number, the MSC2 may obtain the local reference number according to the calling and the called number in the initial address message;

in step 506, after the MSC2 receives the inter-office bearer establishment message sent from the MSC1 in step 504, the MSC2 sends a call setup request to the UE2 according to the called number in the initial address message or according to the called number obtained by the roaming number;

in step 507, the MSC2 judges whether the UE1 and the UE2 of the current call are in one same BSS according to the accessing BSS-ID of the calling, and the MSC2, the BSS and the MSC1 in step 505 all support the local exchange; if the above-mentioned condition is met, it is considered that the current call is the local call and it needs to execute the local exchange;

in step 508, the MSC2 determines that if both the MSC2 and the called BSS meet the local exchange condition, then the MSC2 transfers the local reference obtained from the MSC1 to the UE2, and the local reference transferring can adopt the following modes:

the MSC2 brings the local reference to the called side BSS in the terrestrial circuit assignment message, or transfers the local reference to the called side BSS through the individual notification message;

in step 509, the called replies;

in step 510, if it determines in step 507 that it is a local call, the MSC2 sends the local exchange notification message to the BSS, and notifies the BSS to execute the local exchange, and the message includes the local reference;

in step 511, the called side BSS receives a command of executing the local exchange, associates the calling and called call branch according to the local reference in the command, and executes the local exchange once the association succeeds;

in step 512, after the local exchange succeeds, the BSS sends a local exchange success message to the MSC1, and notifies the MSC1 that the current local exchange is already successful;

in step 513, after the local exchange succeeds, the BSS sends the local exchange success message to the MSC2, and notifies the MSC2 that the current local exchange is already successful;

note: in steps 512-513, the BSS can also only send a local exchange completion message to the MSC at one side, and the MSC notifies the MSC at the other side after receiving the message;

in step 514, the MSC1 and the MSC2 release the terrestrial bearer circuit connected to the BSS, that is, the A port bearer resources. This step is optional.

Of course, the present invention can have a variety of other embodiments. Those skilled in the art can make the corresponding modifications and variations according to the present invention without departing from the spirit and essence of the present invention. And all of these modifications or the variations should be fallen into the scope of the appended claims of the present invention.

INDUSTRIAL APPLICABILITY

The present invention provides a method for implementing local exchange for the local call, to solve the problem that the local exchange is unsuccessful caused by one BBS connecting a plurality of MSCs.

What is claimed is:
1. A method for implementing local exchange for a local call, comprising:

a calling side mobile switch center (MSC) receiving a call setup request from a calling user, and the calling side MSC transferring a local reference to a calling side base station system (BSS) and a called side MSC, and transferring a calling access location information to the called side MSC; and the called side MSC receiving the local reference and transferring the local reference to a called side BSS; and the called side MSC determining that a call is a local call according to the calling access information, and notifying the called side BSS to execute a local exchange;

wherein, the step of the called side MSC determining that the call is a local call according to the calling access information, and notifying the called side BSS to execute the local exchange further comprises:

the called side MSC judging whether the calling and the called are in a same BSS according to the calling access location information; if yes, and both the calling side MSC and the called side MSC meet the local exchange condition, the MSC notifying the BSS to execute the local exchange, the notification message including the local reference; and the called side BSS receiving a command of executing the local exchange, associating a calling call branch and a called call branch according to the local reference in the command, the association being successful and executing the local exchange, and feeding back the association and execution result to the calling side MSC and the called side MSC.

2. The method according to claim 1, wherein, the step of the calling side MSC transferring the local reference to the calling side BSS and the called side MSC further comprises:

the calling side MSC determining that both the calling side MSC and the calling side BSS meet a local exchange condition, and transferring the local reference to the calling side BSS and the called side MSC.

3. The method according to claim 2, wherein, the meeting the local exchange condition is that: the user currently has no session of ongoing communication with other users, which meets a user management strategy for the local exchange of an operator, and both the BSS and the MSC in which the calling user locates meet the local exchange condition.

4. The method according to claim 2, wherein, the step of the calling side MSC transferring the local reference to the calling side BSS and the called side MSC, and transferring the calling access location information to the called side MSC further comprises:

the calling side MSC bringing the assigned local reference in a terrestrial circuit assignment message to the calling side BSS, or transferring the assigned local reference to the calling side BSS through an individual notification message;

when the calling side MSC and the called side MSC belong to different MSCs, the calling side MSC bringing the local reference, the calling side MSC supporting local exchange condition and the calling access location message to the called side MSC through in an initial address message, or transferring the local reference, the calling side MSC supporting local exchange condition and the calling access location message through the individual notification message; and when the local reference is obtained by the calling side MSC according to a calling number and a called number, the called side MSC alternatively obtaining the local reference number according to the calling number and the called number in the initial address message.

5. The implementation method according to claim 1, wherein, the local reference is a number associated with the call which is assigned by the calling side MSC for the current call, and the mode for acquiring the local reference comprises:
   the calling side MSC assigning the local reference according to a calling number and a called number in the call;
   or, the calling side MSC assigning the local reference according to a circuit number or a call indicator between the calling side BSS and the calling side MSC.

6. The method according to claim 1, wherein, the step of the called side MSC transferring the local reference to the called side BSS further comprises:
   the called side MSC receiving the call setup request from the calling side MSC, the called side MSC determining that both the called side MSC and the called side BSS meet the local exchange condition, and the local exchange condition referring to that the user currently has no session of ongoing communication with other users, which meets the user management strategy for the local exchange of an operator; and
   if determining that the called user meets the local exchange condition, the called side MSC transferring the local reference obtained from the calling side MSC to the called side BSS, the transferring step comprising: the called side MSC bringing the local reference to the called side BSS in the terrestrial circuit assignment message, or transferring the local reference to the called side BSS through an individual notification message.

\* \* \* \* \*